(12) United States Patent
Kwon (10) Patent No.: US 9,109,304 B2
(45) Date of Patent: Aug. 18, 2015

(54) ARAMID TIRE CORD AND MANUFACTURING METHOD THEREOF

(75) Inventor: So Yeon Kwon, Busan (KR)

(73) Assignee: KOLON INDUSTRIES, INC., Kwacheon-si (KR)

( * ) Notice: Subject to any disclaimer, the term of this patent is extended or adjusted under 35 U.S.C. 154(b) by 1119 days.

(21) Appl. No.: 12/990,192

(22) PCT Filed: Apr. 28, 2009

(86) PCT No.: PCT/KR2009/002232
§ 371 (c)(1),
(2), (4) Date: Nov. 17, 2010

(87) PCT Pub. No.: WO2009/134063
PCT Pub. Date: Nov. 5, 2009

(65) Prior Publication Data
US 2011/0048604 A1    Mar. 3, 2011

(30) Foreign Application Priority Data

| Apr. 29, 2008 | (KR) | 10-2008-0039924 |
| Apr. 29, 2008 | (KR) | 10-2008-0039993 |
| Apr. 30, 2008 | (KR) | 10-2008-0040179 |

(51) Int. Cl.
| B32B 25/02 | (2006.01) |
| D02J 1/08 | (2006.01) |
| B60C 9/00 | (2006.01) |
| D01D 5/06 | (2006.01) |
| D01D 10/04 | (2006.01) |
| D01F 6/60 | (2006.01) |
| D02G 3/48 | (2006.01) |
| B29B 15/12 | (2006.01) |
| B29K 61/04 | (2006.01) |

(52) U.S. Cl.
CPC ............. D01D 5/06 (2013.01); B29B 15/125 (2013.01); D01D 10/0481 (2013.01); D01F 6/605 (2013.01); D02G 3/48 (2013.01); B29K 2061/04 (2013.01); B29K 2277/10 (2013.01); D10B 2331/021 (2013.01)

(58) Field of Classification Search
CPC .. B29K 2061/04; B29K 2277/10; D02G 3/48; D02G 3/045; D02G 3/477; D02G 3/40; D02J 1/22; D10B 2331/02; D10B 2331/021; D01D 10/0481; D01D 5/06; D01F 6/90; D01F 6/605; D01F 6/60; D01F 6/805; D01F 6/76; D01F 11/08; D01F 11/00; B60C 9/00; B60C 9/2009; B60C 9/0042; B60C 15/04; B60C 9/08; B60C 9/02; B60C 9/22; B60C 11/00; B60C 9/20; B60C 2009/2214; B29D 30/38; B29D 30/44; B29D 30/52; B29B 15/125; Y10S 428/902; Y10S 156/91; C08J 5/04
USPC ............. 428/395, 383, 377, 370, 373, 379, 428/296.4, 364, 343, 372, 375; 152/451, 152/910, 535, 527, 454, 540, 556; 57/243, 57/210, 224, 902, 251, 230, 290; 528/348, 528/337, 321, 229, 329.1, 340, 331, 183, 528/341; 264/103, 184, 205, 181; 427/175, 427/385.5, 386; 156/315, 910; 524/422, 524/606; 442/187
See application file for complete search history.

(56) References Cited

U.S. PATENT DOCUMENTS

| 3,767,756 | A | * | 10/1973 | Blades et al. .................. 264/184 |
| 4,557,967 | A | * | 12/1985 | Willemsen et al. ............ 442/187 |
| 5,240,667 | A | * | 8/1993 | Andrews et al. ............ 264/210.7 |
| 5,246,051 | A | | 9/1993 | Inada et al. |
| 5,882,791 | A | | 3/1999 | van der Werff et al. |

FOREIGN PATENT DOCUMENTS

| JP | 5-8609 A | 1/1993 |
| JP | 6-136630 A | 5/1994 |
| JP | 10-77536 A | 3/1998 |
| JP | 11-189916 A | 7/1999 |
| JP | 2005-171431 A | 6/2005 |
| JP | 2006-207067 A | 8/2006 |

OTHER PUBLICATIONS

Aramid Fibers. http://www.chem.uwec.edu/Chem405_s01/malenirf/project.html, pp. 2-9, updated Apr. 30, 2001.*

* cited by examiner

*Primary Examiner* — Jennifer Chriss
*Assistant Examiner* — Altrev Sykes
(74) *Attorney, Agent, or Firm* — Birch, Stewart, Kolasch & Birch, LLP (57) ABSTRACT

Disclosed is aramid tire cord and a method for manufacturing the same, wherein the aramid tire cord has superior properties on initial modulus change rate, tensile strain, initial modulus and strength retention rate, wherein the initial modulus change rate is not more than 5% after the aramid tire cord is repetitively extended 10 times at 120° C. under the condition that the load corresponding to 10% of the strength at break is applied thereto. Thus, the aramid tire cord of the present invention has the most optimal modulus, optimal crystallization constant and optimal crystalline orientation constant so that the aramid tire cord is superior in its initial modulus change rate, tensile strain and initial modulus retention rate, to thereby obtain good fatigue resistance. Thus, if the aramid tire cord of the present invention is used for a tire-reinforcing material, it is possible to obtain high traveling performance by preventing the property deterioration during the high-speed traveling with repetitively-occurring sequence of high temperature and high pressure.

14 Claims, 2 Drawing Sheets

ARAMID TIRE CORD AND MANUFACTURING METHOD THEREOF

TECHNICAL FIELD

The present invention relates to aramid tire cord and a method for manufacturing the same, and more particularly, to aramid tire cord with superior properties on initial modulus change rate, tensile strain, initial modulus and strength retention rate, and a method for manufacturing the same. Thus, if the aramid tire cord of the present invention is used as tire reinforcing materials, the property is deteriorated at minimum even in a high-speed driving for a long time.

BACKGROUND ART

Tire cord, especially, tire cord treated by an adhesive has been generally used as reinforcing materials for pneumatic tires. The tire cord may be made of nylon fiber, polyester fiber, or cellulose-based modified natural fiber. Among methods for improving performance of finally-obtained rubber products is to enhance the property of the tire cord used as the reinforcing material.

Generally, the nylon fiber having great elongation and strength may be used as reinforcing materials for the tires of large truck applied with a high load, and vehicle driven on a road with a rough surface, for example, an unpaved road. However, since the nylon fiber has a low modulus, the nylon fiber is unsuitable for a racing car driven with high speed, and an automobile requiring a smooth and comfortable ride.

The polyester fiber is superior in dimensional stability and price competition to the nylon fiber. In this respect, more polyester fiber has been increasingly used in the tire code filed. However, the polyester fiber is not appropriate for the tire of the car driven with high speed due to low heat resistance and deteriorated adhesion to rubber.

The cellulose-based modified natural fiber such as rayon fiber has the great strength retention rate and dimensional stability. However, the cellulose-based modified natural fiber may be deteriorated in its strength by moisture. Thus, it necessarily requires a complicated process for preventing the moisture in a method for manufacturing the tire using the cellulose-based modified natural fiber.

In the meantime, it is required that strength and modulus in tire-reinforcing fiber cord used for heavy equipment vehicle, racing car, airplane, and agricultural vehicle be higher than those in the polyester or nylon fiber.

The fiber which can provide the high strength and modulus is aramid fiber, that is, one kind of aromatic polyamide fibers.

However, the aramid fiber has high modulus and low elongation. Thus, if fatigue is repetitively applied to tire cord prepared with the aramid fiber under the environments of high load and stress, the tire prepared with the aramid fiber may have the following problems due to low fatigue resistance of the aramid fiber.

When the vehicle is driven at high speed, a temperature in the tire of the vehicle is elevated. Especially, since the tire is maintained at high temperature and high pressure during the high-speed driving of the vehicle, the tire-reinforcing fiber cord is exposed to the environments of high temperature and high pressure. In this case, if the fiber cord has the low fatigue resistance, the cord property, especially, the travelling performance is lowered by the deteriorated cord strength. More seriously, the tire may burst during the traveling.

DISCLOSURE

Technical Problem

Therefore, the present invention has been made in view of the above problems, and it is an aspect of the present invention to provide aramid tire cord and a method for manufacturing the same, which is capable of preventing one or more problems of the related art.

Another aspect of the present invention is to provide aramid tire cord whose property is deteriorated at minimum in the environments of high temperature and high pressure for a long time, to thereby enable good traveling performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, there is provided aramid tire cord comprising: aramid multifilament, wherein an initial modulus change rate of the aramid tire cord is defined by the following calculation 1, and the initial modulus change rate is not more than 5% after the aramid tire cord is repetitively extended 10 times at 120° C. under the condition that the load corresponding to 10% of the strength at break is applied thereto, $$\text{Initial modulus change rate (\%)}=[(M1-M2)/M1]\times 100, \quad \text{[Calculation 1]}$$

wherein 'M1' is the value of initial modulus (g/d) before the repetitive extension tests, and 'M2' is the value of initial modulus (g/d) after the repetitive extension tests.

At this time, the initial modulus change rate of the aramid tire cord is defined by the above calculation 1, and the initial modulus change rate is not more than 5% after the aramid tire cord is repetitively extended 10 times at 150° C. under the condition that the load corresponding to 10% of the strength at break is applied thereto.

Also, a strength retention rate of the aramid tire cord is defined by the following calculation 2, and the strength retention rate is not less than 95% after the aramid tire cord is repetitively extended 10 times at 120° C. under the condition that the load corresponding to 10% of the strength at break is applied thereto, $$\text{Strength retention rate (\%)}=(S2/S1)\times 100, \quad \text{[Calculation 2]}$$

wherein 'S1' is the value of strength (g/d) before the repetitive extension tests, and 'S2' is the value of strength (g/d) after the repetitive extension tests.

At this time, a strength retention rate of the aramid tire cord is defined by the following calculation 2, and the strength retention rate is not less than 90% after the aramid tire cord is repetitively extended 10 times at 150° C. under the condition that the load corresponding to 10% of the strength at break is applied thereto, $$\text{Strength retention rate (\%)}=(S2/S1)\times 100, \quad \text{[Calculation 2]}$$

wherein 'S1' is the value of strength (g/d) before the repetitive extension tests, and 'S2' is the value of strength (g/d) after the repetitive extension tests.

Also, a tensile strain of the aramid tire cord is defined by the following calculation 3, and the tensile strain is within 0.01~0.3% after the aramid tire cord is maintained at 30° C. for 100 hours under the condition that the load corresponding to 20% of the strength at break is applied thereto, Tensile strain (%)=[(L1−L0)/L0]×100, [Calculation 3]

wherein 'L0' is the length of the aramid tire cord before applying the load thereto, and 'L1' is the length of the aramid tire cord after the aramid tire cord is maintained at 30° C. for 100 hours under the condition that the load corresponding to 20% of the strength at break is applied.

At this time, a tensile strain of the aramid tire cord is defined by the following calculation 3, and the tensile strain is within 0.3~1.0% after the aramid tire cord is maintained at 120° C. for 100 hours under the condition that the load corresponding to 20% of the strength at break is applied thereto, Tensile strain (%)=[(L1−L0)/L0]×100, [Calculation 3]

wherein 'L0' is the length of the aramid tire cord before applying the load thereto, and 'L1' is the length of the aramid tire cord after the aramid tire cord is maintained at 120° C. for 100 hours under the condition that the load corresponding to 20% of the strength at break is applied.

Also, an initial modulus retention rate is defined by the following equation 4, and the initial modulus retention rate is not less than 95%, Initial modulus retention rate (%)=(M'2/M'1)×100, [Calculation 4]

wherein 'M'1' is the value of initial modulus (g/d) in the aramid tire cord after the aramid tire cord is maintained under the environments of 25° C. and 65 RH % for 100 hours, and 'M'2' is the value of initial modulus (g/d) in the aramid tire cord after the aramid tire cord is maintained under the environments of 80° C. and 80 RH % for 100 hours.

Also, a tensile force retention rate is defined by the following equation 5, and the tensile force retention rate is not less than 95%, Tensile force retention rate (%)=(S'2/S'1)×100, [Calculation 5]

wherein 'S'1' is the value of tensile force (g) in the aramid tire cord after the aramid tire cord is maintained under the environments of 25° C. and 65 RH % for 100 hours, and 'S'2' is the value of tensile force (g) in the aramid tire cord after the aramid tire cord is maintained under the environments of 80° C. and 80 RH % for 100 hours.

Also, a crystallization constant of the aramid multifilament is defined by the following equation 6, and the crystallization constant is 0.9~1.0, Crystallization constant=C×D, [Calculation 6]

wherein 'C' is the crystallization degree of the aramid multifilament, and 'D' is the density (g/cm$^3$) of the aramid multifilament.

Also, a crystalline orientation constant of the aramid multifilament is defined by the following calculation 7, and the crystalline orientation constant is 0.5~0.7, Crystalline orientation constant=Xc×Fc, [Calculation 7]

wherein 'Xc' is the value of the crystallization degree of the aramid multifilament, and 'Fc' is the value of the orientation of the aramid multifilament.

The aramid multifilament has 400~750 g/d modulus.

The aramid multifilament contains poly(paraphenylene terephthalamide.

The aramid tire cord has a medium elongation of 0.3~1.5% under the load of 6.75 kg.

The aramid tire cord has a dry-heat shrinkage rate of 0.3~1.0%.

In another aspect of the present invention, there is provided a method for preparing aramid tire cord comprising: spinning a spinning dope containing aromatic polyamide; preparing multifilament by coagulating the spun spinning dope; cleaning the multifilament; and drying and winding the cleaned multifilament, wherein the process of coagulating the spun spinning dope comprises: extruding the spinning dope through a hole of spinneret; and coagulating the spinning dope by sequentially passing through an air gap, a coagulation bath filled with a coagulation solution containing sulfuric acid whose concentration is not more than 3%, and a coagulation tube, wherein a shear rate (SR) in the spinneret and a stretch factor (SF) in the air gap satisfy the following calculation 8, 50,000≤SR+(20,000×SF)≤1,000,000, [Calculation 8]

wherein the shear rate (SR) (sec$^{-1}$) is obtained when dividing the rate (m/second) of the spinning dope extruding through the hole of the spinneret by the diameter (R) of the hole of the spinneret, and the stretch factor (SF) is obtained when dividing the rate (m/second) of the filament discharged through the coagulation tube by the rate (m/second) of the spinning dope extruding through the hole of the spinneret.

Also, a distance (L) from the top surface of the coagulation solution contained in the coagulation bath to a jet opening of the coagulation tube is within a range between 10 to 35 mm.

During the process of winding the multifilament, the dried multifilament is wound at 700~1,500 m/second winding rate.

The method further comprises preparing twisted yarn of plies using the prepared aramid multifilament; dipping the aramid twisted yarn of plies into an adhesive resin solution with Resorcinol-Formaldehyde-Latex (RFL); drying the dipped aramid twisted yarn of plies at 105~200° C. for 10 to 400 seconds; and applying a heat treatment of 105~300° C. to the dried aramid twisted yarn of plies for 10 to 400 seconds.

Advantageous Effects

According to the present invention, aramid tire cord has the most optimal modulus, optimal crystallization constant and optimal crystalline orientation constant so that the aramid tire cord is superior in its initial modulus change rate, tensile strain and initial modulus retention rate, to thereby obtain good fatigue resistance. Thus, if the aramid tire cord of the present invention is used for a tire-reinforcing material, it is possible to obtain high traveling performance by preventing the property deterioration during the high-speed traveling with repetitively-occurring sequence of high temperature and high pressure.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a method for manufacturing aramid tire cord according to one embodiment of the present invention will be described in detail with reference to the accompanying drawings.

First, aramid multifilament used for the aramid tire cord may be manufactured with aromatic polyamide prepared by the following method.

The aromatic polyamide may be prepared by the following method.

A polymerization solvent is prepared by adding inorganic salt to an organic solvent. The organic solvent may be an amide-based organic solvent, a urea-based organic solvent, or their mixture, for example, N-methyl-2-pyrrolidone(NMP); N,N'-dimethylacetamide(DMAc); hexamethylphosphoramide(HMPA); N,N,N',N'-tetramethyl urea(TMU); N,N-dimethylformamide(DMF); or their mixtures.

Next, a mixture solution is prepared by dissolving aromatic diamine in the polymerization solvent. For example, the aromatic diamine may be para-phenylenediamine; 4,4'-diaminobiphenyl; 2,6-naphthalenediamine; 1,5-naphthalenediamine; or 4,4'-diaminobenzanilide. However, it is not limited to these.

Then, a predetermined amount of aromatic diacid halide is added to the mixture solution while stirring the mixture solution, thereby resulting in preliminary polymerization. The example of the aromatic diacid halide may be terephthaloyl dichloride; 4,4'-benzoyl dichloride; 2,6-naphthalenedicarboxyl acid dichloride; or 1,5-naphthalenedicarboxyl acid dichloride. However, it is not limited to these.

After completing the preliminary polymerization process, the aromatic diacid halide is added to the preliminary polymer, whereby aromatic polyamide is finally obtained.

The detailed example of the aromatic polyamide finally obtained by the polymerization process may be poly(paraphenylene terephtalamide: PPD-T); poly(4,4'-benzanilide terephtalamide); poly(paraphenylene-4,4'-biphenylene-dicarboxyl acid amide); or poly(paraphenylene-2,6-naphthalenedicarboxyl acid amide).

Next, an alkali compound is added to the polymerized solution containing the aromatic polyamide so as to neutralize the acid produced during the polymerization reaction. Then, the aromatic polyamide, from which the acid is removed by the neutralization process, is crushed. Thereafter, the polymerization solvent is extracted and removed from the aromatic polyamide.

After the extracting process, a dehydrating process is performed so as to remove the remaining water. Then, the aromatic polyamide is completed through a drying process.

A spinning dope is prepared by dissolving the aromatic polyamide having an intrinsic viscosity (IV) above 5.0 prepared by the aforementioned method in a solvent, wherein the solvent may use concentrated sulfuric acid having a concentration of 97 to 100%. Instead of the concentrated sulfuric acid, chloro-sulfuric acid or fluoro-sulfuric acid may be used. For the smooth spinning process, the concentration of polymer in the spinning dope is about 10 to 25 weight %, preferably.

Figure 1:
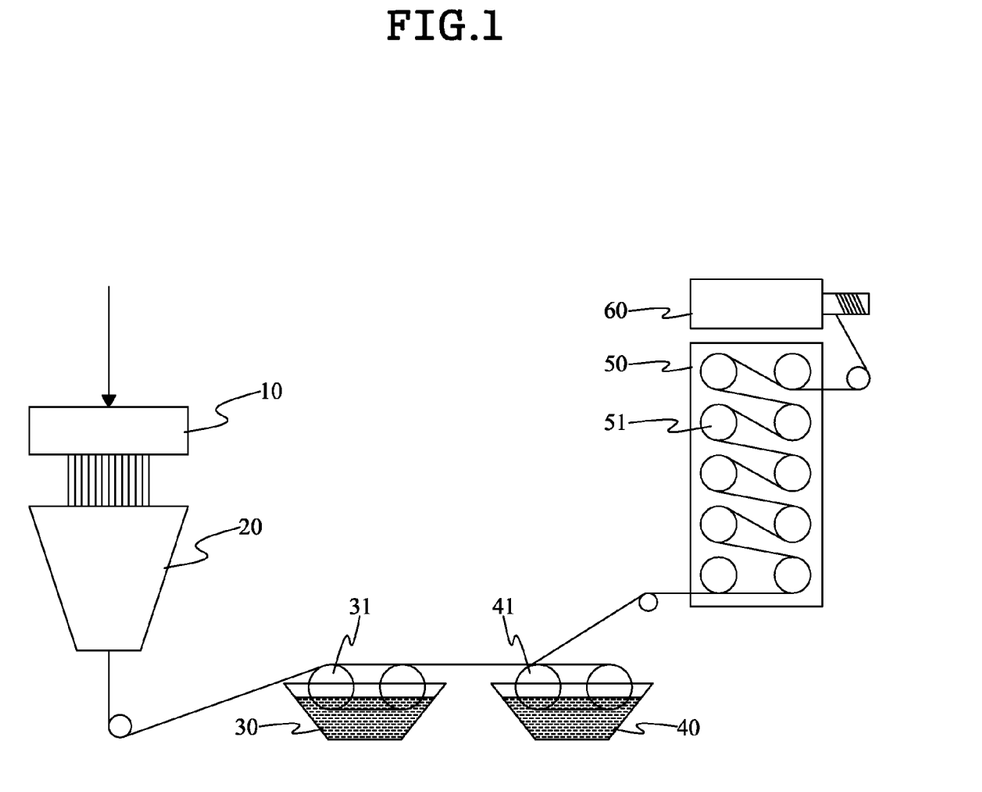
FIG. 1 illustrates a process of preparing aramid multifilament according to one embodiment of the present invention.

Then, the aramid multifilament may be prepared with the aromatic polyamide prepared by the aforementioned method, as shown in FIG. 1. The spinning dope is prepared by dissolving the aromatic polyamide having the intrinsic viscosity (IV) of 5.0 to 7.0, for example, poly(paraphenylene terephtalamide: PPD-T) in the concentrated sulfuric acid. Then, the prepared spinning dope is extruded through a spinneret 10, and is then coagulated in a coagulation unit 20 via an air gap 17 corresponding to a non-coagulation fluid layer, thereby preparing the multifilament.

After that, the remaining sulfuric acid is removed from the multifilament. The sulfuric acid remaining in the multifilament is removed by passing through cleaning baths 30 and 40 filled with water or mixture of water and alkali solution.

Thereafter, the drying process for removing the remaining water from the multifilament is performed in a dry roller 51 of dry unit 50. The dried multifilament is wound through the use of winder 60, to thereby finally obtain the aramid multifilament.

Generally, the aramid multifilament used for the tire cord has high modulus and crystallization degree. Thus, the aramid tire cord prepared with the aramid multifilament might have the following problems, if fatigue is repetitively applied to the aramid tire cord under high load and stress.

Thus, tire-reinforcing aramid cord with low fatigue resistance is largely deteriorated in its property during high-speed traveling with high temperature and pressure, whereby it may case low traveling performance.

In order to manufacture the aramid tire cord with superior property in initial modulus change rate, tensile strain, and initial modulus retention rate, there is provided the aramid multifilament with optimal modulus, optimal crystallization constant, and optimal crystalline orientation constant, to thereby improve the fatigue resistance of the tire cord.

For obtaining the aramid multifilament with optimal modulus, optimal crystallization constant, and optimal crystalline orientation constant, the spinning dope is prepared under the proper spinning and coagulating conditions.

Figure 2:
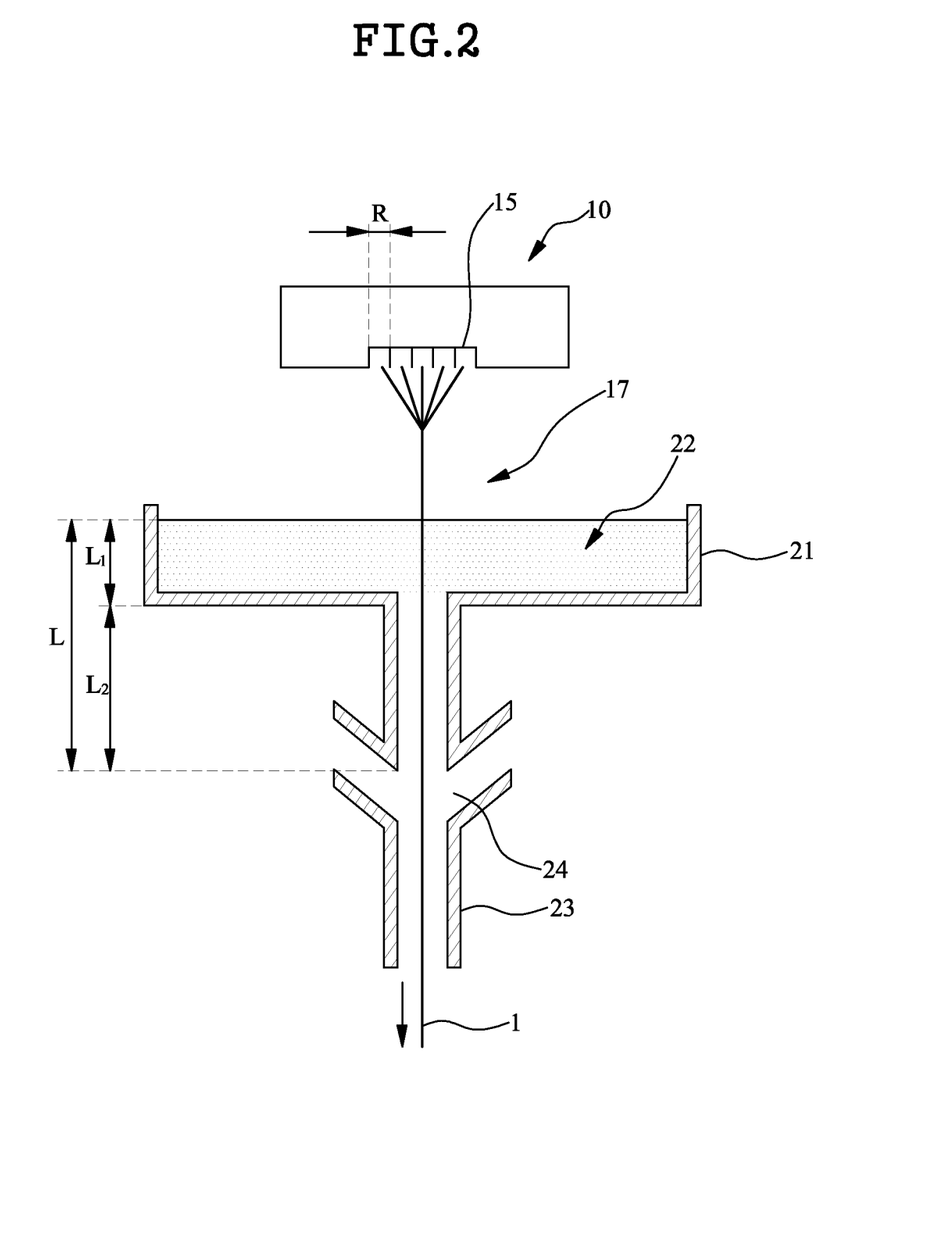
FIG. 2 illustrates a spinning apparatus according to one embodiment of the present invention.

As known from the experimental results of the spinning condition, the crystallization structure of the aramid multifilament is influenced by shear rate (SR) and stretch factor (SF). Meanwhile, on the basis of the experimental results of the coagulating condition, it is known that the crystallization structure of the aramid multifilament is largely influenced by a constituent of coagulation solution 22 and a structure of coagulation unit 20.

In order to explain the optimal spinning and coagulating conditions according to the present invention, a spinning apparatus will be explained with reference to FIG. 2. As shown in FIG. 2, the spinning dope extruding through a hole 15 of spinneret 10 is coagulated by sequentially passing through an air gap 17, a coagulation bath 21, and a coagulation tube 23, thereby preparing the multifilament.

The spinneret 10 is provided with the plurality of holes 15, wherein each hole 15 has a diameter of 0.1 mm or less. If the diameter in each hole 15 of the spinneret 10 is more than 0.1 mm, the strength of filament becomes lowered due to the poor molecular orientation of the prepared filament.

The coagulation bath 21 is positioned under the spinneret 10, wherein the coagulation bath 21 is filled with the coagulation solution 22. Under the coagulation bath 21, there is the coagulation tube 23. Accordingly, as the spinning dope descends after extruding through the hole 15 of the spinneret 10, the spinning dope is coagulated by sequentially passing through the air gap 17 and the coagulation solution 22, thereby preparing the filament. This filament is discharged through the coagulation tube 23 under the coagulation bath 21. Since the coagulation solution 22 as well as the filament is discharged through the coagulation tube 23, the coagulation bath 21 has to be continuously supplied with the coagulation solution by the discharged amount. Also, there is a jet opening 24 in the coagulation tube 23 so that the coagulation solution is jetted out from the jet opening 24 to the filament passing through the coagulation tube 23.

For preparing the aramid multifilament with the optimal modulus, optimal crystallization constant, and optimal crystalline orientation constant, the shear rate (SR) in the spinneret 10 and the stretch factor (SF) in the air gap 17 satisfy the following calculation 8.

$$50{,}000 \leq SR + (20{,}000 \times SF) \leq 1{,}000{,}000 \quad \text{[Calculation 8]}$$

In above calculation 8, the shear rate (SR)(sec$^{-1}$) is obtained when dividing the rate(m/second) of the spinning dope extruding through the hole 15 of the spinneret 10 by the diameter (R) of the hole 15 of the spinneret 10. The stretch factor (SF) is obtained when dividing the rate (m/second) of the filament discharged through the coagulation tube 23 by the rate (m/second) of the spinning dope extruding through the hole 15 of the spinneret 10.

If satisfying the aforementioned condition by properly setting the rate of the spinning dope extruding through the hole 15 of the spinneret 10, the diameter (R) of the hole 15 of the spinneret 10, the rate of the filament discharged through the coagulation tube 23, and the rate of the spinning dope discharged through the hole 15 of the spinneret 10, it is possible to obtain the aramid multifilament with 400 to 750 g/d modulus.

If the value of 'SR+(20,000×SF)' is smaller than 50,000, the orientation of the aramid multifilament is deteriorated so that the modulus becomes smaller than 400 g/d. Meanwhile, if the value of 'SR+(20,000×SF)' is larger than 1,000,000, the modulus of the aramid multifilament becomes larger than 750 g/d. Thus, it is impossible to obtain the optimal crystallization constant and optimal crystalline orientation constant due to the increase of defects. That is, the tire cord prepared by the aramid multifilament has the low fatigue resistance. If the tire cord prepared by the aramid multifilament with the low fatigue resistance is used for manufacturing a tire for high-speed traveling of high temperature and pressure for a long time, the traveling performance may be largely lowered due to the considerably-deteriorated property.

Next, a distance (L) from the top surface of the coagulation solution 22 contained in the coagulation bath 21 to the jet opening 24 of the coagulation tube 23, and more particularly, to the upper end of the jet opening 24 is within a range between 10 to 35 mm. If the distance (L) is less than 10 mm, the coagulation solution 22 is jetted to the filament being not sufficiently coagulated, whereby crystalline orientation of the filament may be damaged. Meanwhile, if the distance (L) is more than 35 mm, the coagulation solution 22 is jetted to the filament being completely coagulated, whereby the surface of filament may be damaged. Thus, a process for jetting the coagulation solution 22 from the jet opening 24 has to be performed after the filament is properly coagulated. In this respect, the distance (L) is within the range of 10 to 35 mm, preferably.

More preferably, a distance ($L_1$) from the top surface of the coagulation solution 22 contained in the coagulation bath 21 to the bottom of the coagulation bath 21 is within a range between 5 to 15 mm. If the distance ($L_1$) is less than 5 mm, it is difficult to control the spinning process due to an turbulence of air. Meanwhile, if the distance ($L_1$) is more than 15 mm, the filament is too coagulated in the coagulation bath 21, thereby making it difficult to set a position of the jet opening 24. That is, if the filament is too coagulated in the coagulation bath 21, the jet opening 24 has to be positioned adjacent to the upper end of the coagulation tube 23 so that the coagulation solution 22 is jetted before the complete coagulation of the filament. However, if the jet opening 24 is positioned too adjacent to the upper end of the coagulation tube 23, it may cause a problem that the coagulation solution 22 is jetted under an insufficient convergence of the filament.

Preferably, a distance ($L_2$) from the bottom of the coagulation bath 21 to the jet opening 24, and more particularly, to the upper end of the jet opening 24 is within a range between 5 to 20 mm. If the distance ($L_2$) is less than 5 mm, the coagulation solution is jetted under an insufficient convergence of the filament, whereby it is difficult to obtain the uniform coagulation in the filament. Meanwhile, if the distance ($L_2$) is more than 20 mm, it may cause a poor pumping for the coagulation solution 22 contained in the coagulation bath 21. That is, when jetting out the coagulation solution 22 from the jet opening 24, a pressure difference is generated between the coagulation bath 21 and the coagulation tube 23, whereby the coagulation solution 22 contained in the coagulation bath 21 is rapidly pumped to the coagulation tube 23. In this case, if the jet opening 24 is positioned at a distance far away from the bottom of the coagulation bath 21, the pumping efficiency for the coagulation solution 22 is lowered.

Preferably, the sulfuric acid is included in the coagulation solution 22, wherein the concentration of the sulfuric acid is not more than 3%, preferably. The crystallization structure such as crystal size and crystallization degree may be largely influenced by the concentration of sulfuric acid in a water solution.

If the sulfuric acid is not included in the coagulation solution 22, the sulfuric acid is rapidly removed from the spinning dope due to a large concentration gradient, whereby it may cause a large difference in crystallization structure between inner and outer layers of the multifilament. In the outer layer of the multifilament, the sulfuric acid is rapidly released therefrom so that its crystallization is not uniform, which might cause the small-sized crystal and the deterioration of crystallization degree. In the inner layer of the multifilament, the sulfuric acid is slowly released therefrom so that it is possible to realize the large-sized crystal and the high crystallization degree. Due to the large difference in property between the inner and outer layers of the multifilament, the multifilament has the excessively low modulus and low strength at break. Thus, if the multifilament having the excessively low modulus and low strength at break is used for the tire cord, the property may be rapidly deteriorated during the high-speed traveling at a high temperature, that is, it may cause a huge problem in safety.

Meanwhile, if the concentration of sulfuric acid in the coagulation solution 22 is higher than 3%, the sulfuric acid is slowly removed from the spinning dope due to a small concentration gradient. Thus, there is no large difference in structure between the inner and outer layers of the multifilament. According as the prepared multifilament has the large crystal size and high crystallization degree, it has the excessively high modulus. However, the tire cord prepared with the aramid multifilament having the high modulus has the low fatigue resistance due to the inferior property in the initial modulus change rate, tensile strain, and initial modulus retention rate. Thus, if the tire cord prepared by the aramid multifilament with the low fatigue resistance is used for high-speed traveling of high temperature and pressure for a long time, the traveling performance may be largely lowered due to the considerably-deteriorated property. More seriously, the tire may burst during the traveling.

In order to prepare the aramid multifilament with the optimal modulus and crystal structure, the sulfuric acid is included in the coagulation solution 22 to coagulate the spinning dope, wherein the concentration of the sulfuric acid is not more than 3%, preferably.

In order to prepare the aramid multifilament with the optimal crystallization constant and crystalline orientation constant, an appropriate winding rate is necessary. The crystalline orientation constant is largely influenced by the winding rate. As the winding rate is increased gradually, the shear stress is increased gradually, and thus the oriented crystals are increased so that the modulus is increased.

However, if the winding rate is too high, the shear stress becomes excessively large, whereby occurrence of the plural ununiform crystals lower the strength at break. Furthermore, the prepared aramid multifilament has the low strength at break, and the high modulus. Also, the tire cord prepared with the aforementioned aramid multifilament having the low strength at break and the high modulus has the low fatigue resistance. Accordingly, the tire cord with low fatigue resistance is largely deteriorated in its property during high-speed traveling with high temperature and pressure, whereby it may case low traveling performance.

Meanwhile, if the winding rate is excessively low, it is difficult to obtain the high oriented crystal, to thereby lower the yield. Also, the modulus becomes low due to the low oriented crystal. If the aramid multifilament with the low modulus is used for the reinforcing material of the tire cord, the traveling performance may be lowered due to the deteriorated dimensional stability during the high-speed traveling of the high temperature and high pressure.

Preferably, the aramid multifilament is prepared at 700~1,500 m/second winding rate. If the winding rate is less than 700 m/second, it may cause the low yield, and the deteriorated durability and dimensional stability due to the low modulus. Meanwhile, if the winding rate is more than 1,500 m/second, the high modulus and the low strength at break are made due to the increased oriented crystal, whereby the traveling performance is lowered by the low fatigue resistance and low durability in property of the aramid multifilament during the high-speed traveling.

The prepared aramid multifilament according to the present invention has the crystallization constant of 0.9~1.0, which is defined by the following calculation 6.

Crystallization constant=$C \times D$ [Calculation 6]

wherein 'C' is the crystallization degree of the aramid multifilament, and 'D' is the density (g/cm$^3$) of the aramid multifilament.

If the crystallization constant of the aramid multifilament is more than 1.0, the modulus becomes high by the high crystallization degree. Thus, the aramid tire cord, which is prepared with the aramid multifilament whose crystallization constant is more than 1.0, has the low fatigue resistance, whereby the traveling performance is lowered and the tire formability is deteriorated. Meanwhile, if the crystallization constant of the aramid multifilament is less than 0.9, the strength at break and the modulus are insufficient due to the low crystallization degree. Thus, the aramid tire cord, which is prepared with the aramid multifilament whose crystallization constant is less than 0.9, has the high initial modulus change rate and the low strength retention rate, to thereby cause the deteriorated durability and dimensional stability.

The aramid multifilament prepared by the present invention has the crystalline orientation constant of 0.5~0.7, which is defined by the following calculation 7.

Crystalline orientation constant=$Xc \times Fc$ [Calculation 7]

wherein 'Xc' is the value of the crystallization degree of the aramid multifilament, and 'Fc' is the value of the orientation of the aramid multifilament.

If the crystalline orientation constant of the aramid multifilament is more than 0.7, the aramid multifilament has the excessive modulus due to the high crystalline orientation. Thus, since the aramid tire cord prepared with the aramid multifilament having the excessive modulus has the low fatigue resistance, the traveling performance is deteriorated, and the tire formability is also deteriorated. Meanwhile, if the crystalline orientation constant of the aramid multifilament is less than 0.5, the strength at break and the modulus are insufficient due to the low crystallization degree. Thus, the aramid tire cord, which is prepared with the aramid multifilament whose crystalline orientation constant is less than 0.5, has the high initial modulus change rate and the low strength retention rate under the high-temperature and humid environments, to thereby cause the deteriorated durability and dimensional stability during the high-speed traveling.

The aramid multifilament prepared by the present invention has 400~750 g/d modulus. If the modulus of the aramid multifilament is more than 750 g/d, it has the excessive modulus. Thus, the aramid tire cord prepared with the aramid multifilament having the excessive modulus may cause the low traveling performance and the deteriorated tire formability. Meanwhile, if the modulus of the aramid multifilament is less than 400 g/d, it is difficult to obtain the sufficient resistance to the externally-applied force due to the low modulus. The aramid tire cord prepared with the aramid multifilament having the low modulus may cause the inferior bearing capacity for the high-speed traveling, whereby the traveling performance is lowered.

A process for preparing the aramid tire cord will be described as follows.

To improve the strength at break, and simultaneously to enhance adhesion to rubber, twisted yarn of plies is prepared by primary twist and final twist using the aforementioned aramid multifilament.

After the aramid multifilaments are primarily twisted through the use of twisting machine, the primarily-twisted aramid multifilaments are finally twisted, to thereby prepare the twisted yarn of plies. In this case, the twist number of each of the primary and final twists is 20~60 turns (per 10 cm), preferably. If the twist number is less than 20 turns (10 cm), the strength of the twisted yarn of plies becomes high, but the elongation at break becomes low, whereby the fatigue resistance of the tire cord is lowered. Also, the surface area of the twisted yarn of plies is too small so that the adhesion to rubber is deteriorated. Meanwhile, if the twist number is more than 60 turns (10 cm), the strength of the tire cord is excessively lowered.

The prepared twisted yarn of plies is dipped into an adhesive resin solution with Resorcinol-Formaldehyde-Latex (RFL). In this case, one-bath dipping or two-bath dipping may be used.

Instead directly dipping the twisted yarn of plies into the adhesive resin solution, the twisted yarn of plies may be woven, and then the woven cord may be treated with the adhesive resin solution.

According to one embodiment of the present invention, the twisted yarn of plies is dipped in such a manner that a pick-up rate of the adhesive resin is from 3 to 12 weight % of the twisted yarn of plies. If the pick-up rate is less than 3 weight %, it may cause the deteriorated adhesion to rubber of the aramid tire cord. Meanwhile, if the pick-up rate is more than 12 weight %, the adhesive resin excessively permeates into the twisted yarn of plies, to thereby deteriorate the strength at break and the fatigue resistance.

The twisted yarn of plies containing the adhesive resin solution by the aforementioned dipping process is dried at 105 to 200° C. for 10 to 400 seconds. Then, a heat treatment of 105 to 300° C. is applied to the dried twisted yarn of plies for 10 to 400 seconds, to thereby complete the process for preparing the aramid tire cord. The drying process is carried out to remove moisture from the twisted yarn of plies, and the heat treatment is carried out to improve the adhesion between the rubber and the twisted yarn of plies by reaction of the adhesive resin and the twisted yarn of plies.

If the time for each of the drying process and the heat treatment is shorter than the aforementioned extent, and the temperature for each of the drying process and the heat treatment is lower than the aforementioned extent, the adhesion between the twisted yarn of plies and the rubber may be deteriorated.

On the contrary, if the time for each of the drying process and the heat treatment is longer than the aforementioned extent, and the temperature for each of the drying process and the heat treatment is higher than the aforementioned extent, the adhesion between the twisted yarn of plies and the rubber may be deteriorated, and the strength at break and fatigue resistance may be deteriorated.

The initial modulus change rate in the prepared aramid tire cord may be defined by the following calculation 1. After the aramid tire cord is repetitively extended 10 times at 120° C. under the condition that the load corresponding to 10% of the strength at break is applied thereto, the initial modulus change rate is not more than 5%.

$$\text{Initial modulus change rate (\%)} = [(M1-M2)/M1] \times 100 \quad \text{[Calculation 1]}$$

wherein 'M1' is the value of initial modulus (g/d) before the repetitive extension tests, and 'M2' is the value of initial modulus (g/d) after the repetitive extension tests.

The aramid tire cord is defined by the above calculation 1. The aramid tire cord is characterized in that its initial modulus change rate is not more than 5% after the repetitive extension tests of 10 times under the condition that the load corresponding to 10% of the strength at break is applied thereto.

If the initial modulus change rate of the aramid tire cord is more than 5%, the tire formability is deteriorated under the repetitive extension conditions during the high-speed traveling, to thereby lower the traveling performance.

The strength retention rate of the prepared aramid tire cord may be defined by the following calculation 2. After the aramid tire cord is repetitively extended 10 times at 120° C. under the condition that the load corresponding to 10% of the strength at break is applied thereto, the strength retention rate is not less than 95%.

$$\text{Strength retention rate (\%)} = (S2/S1) \times 100 \quad \text{[Calculation 2]}$$

wherein 'S1' is the value of strength (g/d) before the repetitive extension tests, and 'S2' is the value of strength (g/d) after the repetitive extension tests.

The aramid tire cord is defined by the above calculation 2. The aramid tire cord is characterized in that its strength retention rate is not less than 90% after the repetitive extension tests of 10 times at 150° C. under the condition that the load corresponding to 10% of the strength at break is applied thereto.

If the strength retention rate of the aramid tire cord doesn't satisfy the aforementioned extent, the traveling performance may be lowered due to the inferior bearing capacity for the high-speed traveling. More seriously, the tire may burst during the traveling.

The tensile strain of the aramid tire cord may be defined by the following calculation 3. After the aramid tire cord is maintained at 30° C. for 100 hours under the condition that the load corresponding to 20% of the strength at break is applied thereto, the tensile strain is within 0.01~0.3%.

$$\text{Tensile strain (\%)} = [(L1-L0)/L0] \times 100 \quad \text{[Calculation 3]}$$

wherein 'L0' is the length of the aramid tire cord before applying the load thereto, and 'L1' is the length of the aramid tire cord after the aramid tire cord is maintained at 30° C. or 120° C. for 100 hours under the condition that the load corresponding to 20% of the strength at break is applied.

The aramid tire cord is defined by the above calculation 3. The aramid tire cord is characterized in that its tensile strain is within 0.3~1.0% after the aramid tire cord is maintained at 120° C. for 100 hours under the condition that the load corresponding to 20% of the strength at break is applied thereto.

The temperature of tire becomes high during its high-speed traveling, whereby the tire cord may be deformed. If the temperature of tire descends by the traveling stop, a tire's predetermined portion being in contact with a road surface is maintained while being deformed due to a continuously-applied vehicle load, but the remaining portions of the tire may be restored to the original form. Accordingly, if the tensile strain of the aramid tire cord is high at the high temperature, it may cause a problem of rough ride.

If the tensile strain of the aramid tire cord is not within the aforementioned extent, the aramid tire cord may be largely deformed under the repetitive extension conditions. Thus, the durability and dimensional stability of the tire may be largely deteriorated due to the inferior tire-bearing capacity, whereby the vehicle using the tire with the deteriorated durability and dimensional stability is uncomfortable to ride in.

The initial modulus retention rate in the aramid tire cord may be defined by the following calculation 4, which is not less than 95%.

$$\text{Initial modulus retention rate (\%)} = (M'2/M'1) \times 100 \quad \text{[Calculation 4]}$$

wherein 'M'1' is the value of initial modulus (g/d) in the aramid tire cord after the aramid tire cord is maintained under the environments of 25° C. and 65 RH % for 100 hours, and 'M'2' is the value of initial modulus (g/d) in the aramid tire cord after the aramid tire cord is maintained under the environments of 80° C. and 80 RH % for 100 hours.

The tensile force retention rate of the aramid tire cord may be defined by the following calculation 5, which is not less than 95%.

$$\text{Tensile force retention rate (\%)} = (S'2/S'1) \times 100 \quad \text{[Calculation 5]}$$

wherein 'S'1' is the value of tensile force(g) in the aramid tire cord after the aramid tire cord is maintained under the environments of 25° C. and 65 RH % for 100 hours, and 'S'2' is the value of tensile force(g) in the aramid tire cord after the aramid tire cord is maintained under the environments of 80° C. and 80 RH % for 100 hours. If the initial modulus retention rate and the strength retention rate in the aramid tire cord are not within the aforementioned extents, the durability and dimensional stability of the tire may be largely deteriorated for the high-speed traveling, whereby it may cause the rough ride.

Under the load of 6.75 kg, the medium elongation of the prepared aramid tire cord is within 0.3~1.5%.

If the medium elongation is more than 1.5%, the serious cord deformation occurs during the high-speed traveling with repetition of traveling and stop, whereby the rough ride is inevitable due to the deteriorated dimensional stability of the tire during the high-speed traveling. Meanwhile, if the medium elongation is less than 0.3%, the tire formability is largely deteriorated.

The dry-heat shrinkage rate of the prepared aramid tire cord is within 0.3~~1.0%.

If the dry-heat shrinkage rate of the prepared aramid tire cord is not within the aforementioned extent, the aramid tire cord may be largely shrunken by the elevated temperature of the tire during the high-speed traveling. Thus, the considerably-deteriorated dimensional stability of the cord may cause the deterioration of tire performance.

The prepared aramid tire cord has the dip strength of 10~23 g/d, the elongation at break of 3~10%, and the adhesive strength of 10 kg or more.

Hereinafter, the aramid tire cords according to the embodiments and comparative examples will be explained in detail. The following embodiments and comparative examples are shown to help the understanding of the present invention, but the spirit or scope of the present invention is not limited to the following embodiments and comparative examples.

Embodiment 1

First, an aromatic diamine solution is prepared by dissolving 80 kg of calcium chloride and 48.67 kg of para-phenylenediamine in 1,000 kg of N-methyl-2-pyrrolidone (NMP).

Then, poly(paraphenylene terephtalamide) polymer (aramid polymer) having 6.8 intrinsic viscosity is prepared by stirring a mixture of the prepared aromatic diamine solution and melted terephthaloyl chloride simultaneously poured into a polymerizing-reaction vessel. In this case, the melted terephthaloyl chloride is added at the same mole ratio as that of the para-phenylenediamine.

The prepared aramid polymer is dissolved in 99% concentrated sulfuric acid, to thereby prepare an optical anisotropic spinning dope whose polymer concentration is 18 weight %.

Then, as shown in FIG. 2, the prepared spinning dope extruding through a spinneret at 1,000 m/second winding rate is passed through an air gap 17 of 7 mm, and is then coagulated in a coagulation unit 20 filled with a coagulation solution 22 corresponding to water solution containing 2.5% sulfuric acid, to thereby prepare multifilament. In this case, a shear rate (SR) in the spinneret is 10,000; a stretch factor (SF) in the air gap 17 is 2; and a value of 'SR+(20,000×SF)' is 50,000.

A distance (L) from a top surface of the coagulation solution 22 contained in a coagulation bath 21 of the coagulation unit 20 to a jet opening 24 of a coagulation tube 23 is 20 mm; a distance ($L_1$) from the top surface of the coagulation solution 22 to the bottom of the coagulation bath 21 is 10 mm; and a distance ($L_2$) from the bottom of the coagulation bath 21 to the jet opening 24 is 10 mm.

As shown in FIG. 1, after cleaning and drying process, a heat treatment is repetitively carried out 5 times, wherein the heat treatment is applied at 550° C. for 0.3 seconds, to thereby prepare aramid multifilament of 1500 denior/1000 filament.

Embodiments 2 to 5

Aramid multifilament is prepared by the same method as that of the aforementioned Embodiment 1, except that a concentration of sulfuric acid solution contained in a coagulation solution in a coagulation bath 21 is changed to 0.5%, 1.0%, 1.5%, or 2.0%.

COMPARATIVE EXAMPLES 1 AND 2

Aramid multifilament is prepared by the same method as that of the aforementioned Embodiment 1, except that a concentration of sulfuric acid solution contained in a coagulation solution in a coagulation bath 21 is changed to 0% or 3.5%.

Embodiments 6 to 8

Aramid multifilament is prepared by the same method as that of the aforementioned Embodiment 1, except that a winding rate is changed to 800 m/second, 1200/second, or 1400/second.

COMPARATIVE EXAMPLES 3 AND 4

Aramid multifilament is prepared by the same method as that of the aforementioned Embodiment 1, except that a winding rate is changed to 600 m/second or 1600/second.

COMPARATIVE EXAMPLE 5

Aramid multifilament is prepared by the same method as that of the aforementioned Embodiment 1, except that a spinning dope is coagulated in a coagulation unit 20 without passing through an air gap 17 (non-coagulation fluid layer).

Embodiments 9 to 11

Aramid multifilament is prepared by the same method as that of the aforementioned Embodiment 1, except that shear rate(SR) and stretch factor(SF) are changed as shown in the following Table 1.

COMPARATIVE EXAMPLES 6 AND 7

Aramid multifilament is prepared by the same method as that of the aforementioned Embodiment 1, except that shear rate(SR) and stretch factor(SF) are changed as shown in the following Table 1.

TABLE 1

|  | Shear Rate (SR) | Stretch Factor (SF) | Value (SR + (20,000 × SF) |
|---|---|---|---|
| Embodiment 9 | 500,000 | 25 | 1,000,000 |
| Embodiment 10 | 100,000 | 5 | 200,000 |
| Embodiment 11 | 200,000 | 10 | 400,000 |
| Comparative example 6 | 10,000 | 1.5 | 40,000 |
| Comparative example 7 | 410,000 | 30 | 1,100,000 |

Properties of the aramid multifilaments prepared by the aforementioned Embodiments 1 to 11 and comparative examples 1 to 7 are measured by the following method, and are shown in the following Table 2.

Modulus (g/d)

The modulus (g/d) is calculated from a slope in a stress-strain curve of the aramid multifilament samples according to the aforementioned strength measurement conditions.

Crystallization Constant $$\text{Crystallization constant} = C \times D$$

wherein 'C' is the crystallization degree of the aramid multifilament, and 'D' is the density (g/cm$^3$) of the aramid multifilament. Also, the crystallization degree is calculated by [(D−Da)/(Dc−Da)], wherein 'D' is the density (g/cm$^3$) measured through a density gradient column, 'Da' is the density value of non-crystal region, and 'Dc' is the density value of crystal region.

Crystalline Orientation Constant $$\text{Crystalline orientation constant} = Xc \times Fc$$

wherein 'Xc' is the value of crystallization degree of the aramid multifilament, and 'Fc' is the orientation value of the aramid multifilament. Also, the orientation value may be calculated by [f(010)+f(100)]/2 through the use of X-ray apparatus, wherein 'f(010)' and 'f(100)' may be obtained by averaging orientation coefficients calculated from a width at ½ height of wide-angle diffraction pattern on (010) and (100) crystal surfaces.

TABLE 2

| | Concentration of sulfuric acid | Winding rate (m/second) | Whether or not spinning dope passes through air gap | Modulus (g/d) | Crystallization constant | Crystalline orientation constant |
|---|---|---|---|---|---|---|
| Embodiment 1 | 2.5 | 1000 | Passed | 650 | 0.97 | 0.66 |
| Embodiment 2 | 0.5 | 1000 | Passed | 420 | 0.91 | 0.52 |
| Embodiment 3 | 1.0 | 1000 | Passed | 480 | 0.94 | 0.55 |
| Embodiment 4 | 1.5 | 1000 | Passed | 530 | 0.95 | 0.61 |
| Embodiment 5 | 2.0 | 1000 | Passed | 610 | 0.97 | 0.65 |
| Comparative example 1 | 0 | 1000 | Passed | 310 | 0.74 | 0.44 |
| Comparative example 2 | 3.5 | 1000 | Passed | 830 | 1.43 | 0.82 |
| Embodiment 6 | 2.5 | 800 | Passed | 560 | 0.95 | 0.62 |
| Embodiment 7 | 2.5 | 1200 | Passed | 690 | 0.98 | 0.67 |
| Embodiment 8 | 2.5 | 1400 | Passed | 730 | 0.99 | 0.69 |
| Comparative example 3 | 2.5 | 600 | Passed | 350 | 0.85 | 0.46 |
| Comparative example 4 | 2.5 | 1600 | Passed | 930 | 1.43 | 0.82 |
| Comparative example 5 | 2.5 | 1000 | Unpassed | 320 | 0.84 | 0.47 |
| Embodiment 9 | 2.5 | 1000 | Passed | 720 | 0.98 | 0.67 |
| Embodiment 10 | 2.5 | 1000 | Passed | 610 | 0.97 | 0.66 |
| Embodiment 11 | 2.5 | 1000 | Passed | 660 | 0.97 | 0.67 |
| Comparative example 6 | 2.5 | 1000 | Passed | 310 | 0.83 | 0.45 |
| Comparative example 7 | 2.5 | 1000 | Passed | 870 | 1.43 | 0.82 |

The aramid tire cord is prepared by the following method using the aramid multifilament prepared by the aforementioned method.

Embodiment 12

The aramid multifilament prepared by the embodiment 1 is primarily twisted (Z-twisted) 30 turns per 10 cm by the twisting machine (Cable & Cord 3 type twister, Allma Co.), and then the primarily-twisted 2 plies are finally twisted (S-twisted) 30 turns per 10 cm, to thereby prepare twisted yarn of plies. Then, the prepared twisted yarn of plies is woven to prepare grey cord.

The grey cord is dipped into an adhesive resin solution containing 2.0 weight % of resorcinol, 3.2 weight % of formalin (37%), 1.1 weight % of sodium hydroxide (10%), 43.9 weight % of styrene/butadiene/vinylpyridine (15/70/15) rubber (41%), and water. Also, a pick-up rate is controlled to be 5 weight % of the grey cord. Thereafter, the grey cord dipped into the adhesive resin solution is dried at 150° C. for 60 seconds, and a heat treatment of 250° C. is applied for 60 seconds, to thereby prepare aramid tire cord.

Embodiments 13 to 22

Aramid tire cords are prepared by the same method as that of the aforementioned Embodiment 12 except using the aramid multifilaments prepared by the aforementioned Embodiments 2 to 11.

COMPARATIVE EXAMPLES 8 TO 14

Aramid tire cords are prepared by the same method as that of the aforementioned Embodiment 12 except using the aramid multifilaments prepared by the aforementioned Comparative examples 1 to 7.

Properties of the aramid tire cords prepared by the aforementioned Embodiments 12 to 22 and comparative examples 8 to 14 are measured by the following method, and are shown in the following Table 3.

Initial Modulus Change Rate (%)

The initial modulus change rate is measured by using the sample of aramid tire cord having 25 cm length through the use of Instron tester (Instron Engineering Corp, Canton, Mass.) in ASTM D-885 testing method.

First, the stress-strain curve is obtained after the sample is repetitively extended 10 times at 120° C. or 150° C. under the condition that the load corresponding to 10% of the strength at break is applied thereto. After measuring the slope value of the stress-strain curve in the range where the load of 3~4 g/d is applied to the sample, the measured slope value is set as the initial modulus (M2) after the repetitive extension test.

Then, the stress-strain curve is obtained by applying the load until another sample is broken at 25° C. After measuring the slope value of the stress-strain curve in the range where the load of 3~4 g/d is applied to the sample, the measured slope value is set as the initial modulus (M1) before the repetitive extension test.

The initial modulus change rate is measured at 120° C. or 150° C. by applying M1 and M2 to the following calculation 1.

$$\text{Initial modulus change rate (\%)} = [(M1-M2)/M1] \times 100 \quad \text{[Calculation 1]}$$

Strength Retention Rate (%)

The strength retention rate is measured by using the sample of aramid tire cord having 25 cm length through the use of Instron tester (Instron Engineering Corp, Canton, Mass.) in ASTM D-885 testing method.

After the aramid tire cord is repetitively extended 10 times at 120° C. under the condition that the load corresponding to 10% of the strength at break is applied thereto, the sample is extended until it is broken. In this case, the strength (g/d) is measured at a point in time when the sample is broken, and the measured strength (g/d) is set as the strength (S2) after the repetitive extension test.

Then, another sample is extended at 25° C. until it is broken. In this case, the strength (g/d) is measured at a point in time when another sample is broken, and the measured strength (g/d) is set as the strength (S1) before the repetitive extension test.

The strength retention rate is measured at 120° C. or 150° C. by applying S1 and S2 to the following calculation 2.

Strength retention rate (%)=(S2/S1)×100 [Calculation 2]

Tensile Strain (%)

After the aramid tire cord is maintained at 30° C. or 120° C. for 100 hours under the condition that the load corresponding to 20% of the strength at break is applied thereto, the tensile strain is measured at 30° C. or 120° C. by the following calculation 3.

Tensile strain (%)=[(L1−L0)/L0]×100 [Calculation 3]

wherein 'L0' is the length of the aramid tire cord before applying the load thereto, and 'L1' is the length of the aramid tire cord after the aramid tire cord is maintained at 30° C. or 120° C. for 100 hours under the condition that the load corresponding to 20% of the strength at break is applied.

Initial Modulus Retention Rate (%)

The initial modulus retention rate is measured by using the sample of aramid tire cord having 25 cm length through the use of Instron tester (Instron Engineering Corp, Canton, Mass.) in ASTM D-885 testing method.

First, the stress-strain curve is obtained through the use of Instron tester after the sample is maintained under the environments of 25° C. and 65 RH % for 100 hours. After measuring the slope value of the stress-strain curve in the range where the load of 3~4 g/d is applied to the sample, the measured slope value is set as the initial modulus (M'1) measured after being maintained under the environments of 25° C. and 65 RH % for 100 hours.

Then, the stress-strain curve is obtained through the use of Instron tester after another sample is maintained under the environments of 80° C. and 80 RH % for 100 hours. After measuring the slope value of the stress-strain curve in the range where the load of 3~4 g/d is applied to another sample, the measured slope value is set as the initial modulus (M'2) measured after being maintained under the environments of 80° C. and 80 RH % for 100 hours.

The initial modulus retention rate of the aramid tire cord is measured by applying M'2 and M'1 to the following calculation 4.

Initial modulus retention rate (%)=(M'2/M'1)×100 [Calculation 4]

Tensile Force Retention Rate (%)

The tensile force retention rate is measured by using the sample of aramid tire cord having 25 cm length through the use of Instron tester (Instron Engineering Corp, Canton, Mass.) in ASTM D-885 testing method.

First, the tensile force (g) is obtained through the use of Instron tester after the sample is maintained under the environments of 25° C. and 65 RH % for 100 hours, which is referred to as the tensile force (S'1) measured after being maintained under the environments of 25° C. and 65 RH % for 100 hours.

Then, the tensile force (g) is obtained through the use of Instron tester after the sample is maintained under the environments of 80° C. and 80 RH % for 100 hours, which is referred to as the tensile force (S'2) measured after being maintained under the environments of 80° C. and 80 RH % for 100 hours.

The tensile force retention rate is measured by applying S'2 and S'1 to the following calculation 5.

Tensile force retention rate (%)=(S'2/S'1)×100 [Calculation 5]

Medium Elongation (%)

The elongation-load graph is obtained through the use of Instron tester (Instron Engineering Corp, Canton, Mass.) in ASTM D-885 testing method. In this case, the elongation change rate at the point of 6.75 kg load is measured from the elongation-load graph, which is referred to as the medium elongation.

Dry-heat Shrinkage Rate (%)

Through the use of shrinkage force tester (TestRite Ltd.) in ASTM D 4974-04, a length (L2) under the load of 0.01 g/d is measured, and a length (L3) under the environments of 0.01 g/d and 180° C. for 2 minutes is measured. Then, the dry-heat shrinkage rate is calculated by applying L2 and L3 to the following calculation.

Dry-heat shrinkage rate (%)=[(L2−L3)/L2]×100

TABLE 3

| | Initial modulus change rate(%) | | Strength retention rate(%) | | Tensile strain(%) | | Initial modulus retention rate(%) | Tensile force retention rate(%) | Medium elongation(%) | Dry-heat shrinkage rate(%) |
|---|---|---|---|---|---|---|---|---|---|---|
| | 120 | 150 | 120 | 150 | 30 | 120 | | | | |
| Embodiment 12 | 3 | 4 | 96 | 93 | 0.2 | 0.5 | 98 | 99 | 0.8 | 0 |
| Embodiment 13 | 2 | 3 | 99 | 98 | 0.1 | 0.8 | 96 | 97 | 1.3 | 0 |
| Embodiment 14 | 2 | 3 | 98 | 96 | 0.1 | 0.8 | 97 | 98 | 1.0 | 0 |
| Embodiment 15 | 3 | 3 | 96 | 94 | 0.1 | 0.7 | 99 | 99 | 0.8 | 0 |
| Embodiment 16 | 3 | 4 | 96 | 93 | 0.2 | 0.5 | 98 | 97 | 0.5 | 0 |
| Embodiment 17 | 3 | 3 | 96 | 94 | 0.1 | 0.7 | 99 | 99 | 0.8 | 0 |
| Embodiment 18 | 4 | 4 | 96 | 93 | 0.1 | 0.7 | 96 | 96 | 0.6 | 0 |
| Embodiment 19 | 4 | 4 | 96 | 94 | 0.2 | 0.7 | 96 | 96 | 0.4 | 0 |
| Embodiment 20 | 4 | 4 | 96 | 93 | 0.1 | 0.7 | 96 | 96 | 0.6 | 0 |
| Embodiment 21 | 3 | 4 | 96 | 93 | 0.2 | 0.5 | 98 | 97 | 0.5 | 0 |

TABLE 3-continued

|  | Initial modulus change rate(%) | | Strength retention rate(%) | | Tensile strain(%) | | Initial modulus retention rate(%) | Tensile force retention rate(%) | Medium elongation(%) | Dry-heat shrinkage rate(%) |
| --- | --- | --- | --- | --- | --- | --- | --- | --- | --- | --- |
| | 120 | 150 | 120 | 150 | 30 | 120 | | | | |
| Embodiment 22 | 2 | 2 | 98 | 97 | 0.1 | 0.4 | 99 | 97 | 0.8 | 0 |
| Comparative example 8 | 6 | 8 | 91 | 88 | 0.6 | 1.3 | 91 | 92 | 1.9 | 0.5 |
| Comparative example 9 | 8 | 9 | 89 | 84 | 0.7 | 1.5 | 87 | 87 | 0.1 | 0.4 |
| Comparative example 10 | 7 | 9 | 87 | 84 | 0.7 | 1.6 | 87 | 86 | 2.0 | 0.6 |
| Comparative example 11 | 12 | 14 | 88 | 87 | 0.6 | 1.5 | 90 | 88 | 0.1 | 0.4 |
| Comparative example 12 | 13 | 14 | 85 | 81 | 0.9 | 1.7 | 83 | 81 | 1.7 | 0.5 |
| Comparative example 13 | 13 | 14 | 85 | 81 | 0.9 | 1.7 | 83 | 81 | 1.7 | 0.7 |
| Comparative example 14 | 12 | 14 | 88 | 87 | 0.6 | 1.5 | 90 | 88 | 0.1 | 5.1 |

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. Aramid tire cord comprising a twisted yarn of plies prepared by primarily twisting aramid multifilament containing poly(paraphenylene terephthalamide) with 20 to 60 turns per 10 cm to form a ply and finally twisting the plies with 20 to 60 turns per 10 cm,
wherein an initial modulus change rate of the aramid tire cord is defined by the following calculation 1, and
the initial modulus change rate is not more than 5% after the aramid tire cord is repetitively extended 10 times at 120° C. under the condition that the load corresponding to 10% of the strength at break is applied thereto, $$\text{Initial modulus change rate (\%)} = [(M1-M2)/M1] \times 100, \quad [\text{Calculation 1}]$$

wherein 'M1' is the value of initial modulus (g/d) before the repetitive extension tests, and 'M2' is the value of initial modulus (g/d) after the repetitive extension tests.

2. The aramid tire cord according to claim 1,
wherein the initial modulus change rate of the aramid tire cord is defined by the above calculation 1, and
the initial modulus change rate is not more than 5% after the aramid tire cord is repetitively extended 10 times at 150° C. under the condition that the load corresponding to 10% of the strength at break is applied thereto.

3. The aramid tire cord according to claim 1,
wherein a strength retention rate of the aramid tire cord is defined by the following calculation 2, and
the strength retention rate is not less than 95% after the aramid tire cord is repetitively extended 10 times at 120° C. under the condition that the load corresponding to 10% of the strength at break is applied thereto, $$\text{Strength retention rate(\%)} = (S2/S1) \times 100, \quad [\text{Calculation 2}]$$

wherein 'S1' is the value of strength (g/d) before the repetitive extension tests, and 'S2' is the value of strength (g/d) after the repetitive extension tests.

4. The aramid tire cord according to claim 1,
wherein a strength retention rate of the aramid tire cord is defined by the following calculation 2, and
the strength retention rate is not less than 90% after the aramid tire cord is repetitively extended 10 times at 150° C. under the condition that the load corresponding to 10% of the strength at break is applied thereto, $$\text{Strength retention rate(\%)} = (S2/S1) \times 100, \quad [\text{Calculation 2}]$$

wherein 'S1' is the value of strength (g/d) before the repetitive extension tests, and 'S2' is the value of strength (g/d) after the repetitive extension tests.

5. The aramid tire cord according to claim 1,
wherein a tensile strain of the aramid tire cord is defined by the following calculation 3, and
the tensile strain is within 0.01-0.3% after the aramid tire cord is maintained at 30° C. for 100 hours under the condition that the load corresponding to 20% of the strength at break is applied thereto, $$\text{Tensile strain(\%)} = [(L1-L0)/L0] \times 100, \quad [\text{Calculation 3}]$$

wherein 'L0' is the length of the aramid tire cord before applying the load thereto, and 'L1' is the length of the aramid tire cord after the aramid tire cord is maintained at 30° C. for 100 hours under the condition that the load corresponding to 20% of the strength at break is applied.

6. The aramid tire cord according to claim 1,
wherein a tensile strain of the aramid tire cord is defined by the following calculation 3, and
the tensile strain is within 0.3-1.0% after the aramid tire cord is maintained at 120° C. for 100 hours under the condition that the load corresponding to 20% of the strength at break is applied thereto, $$\text{Tensile strain(\%)} = [(L1-L0)/L0] \times 100, \quad [\text{Calculation 3}]$$

wherein 'L0' is the length of the aramid tire cord before applying the load thereto, and 'L1' is the length of the aramid tire cord after the aramid tire cord is maintained at 120° C. for 100 hours under the condition that the load corresponding to 20% of the strength at break is applied.

7. The aramid tire cord according to claim 1,
wherein an initial modulus retention rate is defined by the following equation 4, and
the initial modulus retention rate is not less than 95%, $$\text{Initial modulus retention rate}(\%)=(M'2/M'1)\times100, \quad \text{[Calculation 4]}$$

wherein 'M'1' is the value of initial modulus(g/d) in the aramid tire cord after the aramid tire cord is maintained under the environments of 25° C. and 65 RH % for 100 hours, and 'M'2' is the value of initial modulus (g/d) in the aramid tire cord after the aramid tire cord is maintained under the environments of 80° C. and 80 RH % for 100 hours.

8. The aramid tire cord according to claim 1,
wherein a tensile force retention rate is defined by the following equation 5, and
the tensile force retention rate is not less than 95%, $$\text{Tensile force retention rate}(\%)=(S'2/S'1)\times100, \quad \text{[Calculation 5]}$$

wherein 'S'1' is the value of tensile force (g) in the aramid tire cord after the aramid tire cord is maintained under the environments of 25° C. and 65 RH % for 100 hours, and 'S'2' is the value of tensile force (g) in the aramid tire cord after the aramid tire cord is maintained under the environments of 80° C. and 80 RH % for 100 hours.

9. The aramid tire cord according to claim 1,
wherein a crystallization constant of the aramid multifilament is defined by the following equation 6, and
wherein the crystallization constant is 0.9-1.0, $$\text{Crystallization constant}=C\times D, \quad \text{[Calculation 6]}$$

wherein 'C' is the crystallization degree of the aramid multifilament, and 'D' is the density (g/cm$^3$) of the aramid multifilament.

10. The aramid tire cord according to claim 1,
wherein a crystalline orientation constant of the aramid multifilament is defined by the following calculation 7, and
the crystalline orientation constant is 0.5-0.7, $$\text{Crystalline orientation constant}=Xc\times Fc, \quad \text{[Calculation 7]}$$

wherein 'Xc' is the value of the crystallization degree of the aramid multifilament, and 'Fc' is the value of the orientation of the aramid multifilament.

11. The aramid tire core according to claim 1, wherein the aramid multifilament has 400-750 g/d modulus.

12. The aramid tire cord according to claim 1, wherein the aramid multifilament contains poly(paraphenylene terephtalamide.

13. The aramid tire cord according to claim 1, wherein the aramid tire cord has a medium elongation of 0.3-1.5% under the load of 6.75 kg.

14. The aramid tire cord according to claim 1, wherein the aramid tire cord has a dry-heat shrinkage rate of 0.3--1.0%.

* * * * *